United States Patent
Clow et al.

(10) Patent No.: US 6,691,172 B1
(45) Date of Patent: Feb. 10, 2004

(54) COMMUNICATION SYSTEM FOR DEFINING A VARIABLE GROUP OF PROCESSORS FOR RECEIVING A TRANSMITTED COMMUNICATION

(75) Inventors: Robert J. Clow, Aurora, IL (US); Lee D. Tice, Bartlett, IL (US); Jerry L. Howard, Herscher, IL (US); Manley S. Keeler, Naperville, IL (US); John F. Meggesin, St. Charles, IL (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/211,546

(22) Filed: Dec. 15, 1998

(51) Int. Cl.[7] .................. G06F 15/16; G06F 15/76; G06F 9/30
(52) U.S. Cl. .................. 709/246; 712/32; 712/214
(58) Field of Search .................. 709/223, 224, 709/244, 207, 246, 205, 208, 245; 370/270, 312, 432; 340/825.52, 10.32, 286.02, 3.52, 3.53, 517, 522; 712/32, 214

(56) References Cited

U.S. PATENT DOCUMENTS

| | | | |
|---|---|---|---|
| 4,525,700 A | | 6/1985 | Kimura et al. |
| 4,535,450 A | | 8/1985 | Tan |
| 4,667,193 A | | 5/1987 | Cotie et al. |
| 4,701,625 A | | 10/1987 | Kimura |
| 4,761,646 A | | 8/1988 | Choquet et al. |
| 4,916,432 A | | 4/1990 | Tice et al. |
| 4,918,690 A | | 4/1990 | Markkula, Jr. et al. |
| 4,926,375 A | * | 5/1990 | Mercer et al. ............... 709/201 |
| 4,939,728 A | | 7/1990 | Markkula, Jr. et al. |
| 4,947,484 A | | 8/1990 | Twitty et al. |
| 4,951,029 A | * | 8/1990 | Severson ............... 340/506 |
| 4,964,076 A | * | 10/1990 | Schurk ............... 340/825.5 |
| 4,969,146 A | | 11/1990 | Twitty et al. |

(List continued on next page.)

FOREIGN PATENT DOCUMENTS

| | | | | |
|---|---|---|---|---|
| EP | 516373 A1 | 12/1992 | | |
| EP | 516374 B1 | 12/1992 | | |
| EP | 752792 A2 | * 1/1997 | ............ | H04Q/7/16 |
| EP | 1087212 A2 | * 3/2001 | ........... | G01D/11/24 |
| GB | 2178878 A | * 2/1987 | | |

OTHER PUBLICATIONS

Tsang, P.W.M. et al., "Development of a distributive lighting control system using Local Operating Network", IEEE Transactions on Consumer Electronics, vol. 40, iss. 4, pp. 879–889, Nov. 1994.*

Koon–Soek, Lee et al., "A new control protocol for home appliances–LnCP", IEEE International Symposium on Industrial Electronics, vol. 1, pp. 286–291, Jun. 2001.*

(List continued on next page.)

*Primary Examiner*—Jason D. Cardone
(74) *Attorney, Agent, or Firm*—Paul M. Vargo; Welsh & Katz, Ltd.

(57) ABSTRACT

A flexible multi-processor communications system supports variable message lengths and variable groups and application designations at respective processors. The receiving processors determine what action, if any, needs to be taken in response to the combination of group and application information in the messages. The receiving processors can include pluralities of pre-stored groups and applications along with associated priorities and the functions to perform.

37 Claims, 3 Drawing Sheets

U.S. PATENT DOCUMENTS

| | | | |
|---|---|---|---|
| 4,969,147 A | | 11/1990 | Markkula, Jr. et al. |
| 4,996,518 A | | 2/1991 | Takahashi et al. |
| 5,117,219 A | | 5/1992 | Tice et al. |
| 5,193,152 A | | 3/1993 | Smith |
| 5,297,143 A | | 3/1994 | Fridrich et al. |
| 5,475,364 A | * | 12/1995 | Kenet .......................... 340/522 |
| 5,483,222 A | * | 1/1996 | Tice ............................ 340/518 |
| 5,500,852 A | | 3/1996 | Riley |
| 5,513,324 A | | 4/1996 | Dolin, Jr. et al. |
| 5,519,878 A | | 5/1996 | Dolin, Jr. |
| 5,525,962 A | | 6/1996 | Tice |
| 5,539,389 A | * | 7/1996 | Bystrak et al. ......... 340/825.52 |
| 5,561,769 A | * | 10/1996 | Kumar et al. ............... 709/202 |
| 5,592,622 A | * | 1/1997 | Isfeld et al. ................ 709/207 |
| 5,625,886 A | * | 4/1997 | Raes .......................... 455/519 |
| 5,659,292 A | * | 8/1997 | Tice ............................ 340/522 |
| 6,014,084 A | * | 1/2000 | Tice .......................... 340/3.51 |
| 6,075,789 A | * | 6/2000 | Kasslin et al. .............. 370/338 |
| 6,078,415 A | * | 6/2000 | Yamamoto ..................... 398/1 |
| 6,104,871 A | * | 8/2000 | Badovinatz et al. ........ 709/100 |
| 6,122,670 A | * | 9/2000 | Bennett et al. ............. 709/236 |
| 6,167,057 A | * | 12/2000 | Kishigami et al. .......... 370/445 |
| 6,167,447 A | * | 12/2000 | Tice ........................... 709/224 |
| 6,252,501 B1 | * | 6/2001 | Tice et al. ................... 340/506 |
| 6,272,135 B1 | * | 8/2001 | Nakatsugawa .............. 370/390 |
| 6,292,541 B1 | | 9/2001 | Tice et al. |
| 6,320,501 B1 | * | 11/2001 | Tice et al. ................... 340/517 |
| 6,326,880 B1 | * | 12/2001 | Tice ...................... 340/286.05 |
| 6,366,215 B1 | * | 4/2002 | Tice et al. ..................... 706/46 |
| 6,598,033 B2 | * | 7/2003 | Ross et al. .................. 340/506 |
| 6,606,028 B1 | * | 8/2003 | Tice et al. ................... 340/506 |

OTHER PUBLICATIONS

Meertens, Lambert et al., "Peer–to–peer coordination of autonomous sensors in high–latency networks using distributes scheduling and data fusion", Kestrel Institute Technical Report (KES.U.01.09), ants.kestrel.edu, pp. 1–25, Dec. 2001.*

Sun Microsystems, "Project JXTA v2.0: Java Programmer's Guide", www.jxta.org/project/www/white_papers.html, pp. 1–134, May 2003.*

* cited by examiner

COMMUNICATION SYSTEM FOR DEFINING A VARIABLE GROUP OF PROCESSORS FOR RECEIVING A TRANSMITTED COMMUNICATION

FIELD OF THE INVENTION

This invention pertains to multi-processor communications systems. More particularly, the invention pertains to such systems wherein processors can be grouped in different ways.

BACKGROUND OF THE INVENTION

Multi-processor communications systems particularly for use in monitoring a region or regions are known. One particular form of such a system is disclosed in Tice et al U.S. Pat. No. 5,525,962 entitled Communication System and Method assigned to the assignee hereof and incorporated by reference. Another such system is disclosed in Tice et al U.S. Pat. No. 4,916,432 entitled Smoke and Fire Detection System Communication, also assigned to the assignee hereof and incorporated by reference.

Known systems, while effective for their intended purpose, have exhibited some limitations. Typical systems usually have preset message lengths which are not field programmable. It would be desirable if the flexibility of such systems could be enhanced by providing field programmable, message lengths. Such flexibility would take into account newly developed formats, improvements or features which are intended to be field installable or field upgradeable.

SUMMARY OF THE INVENTION

A flexible multi-processor communications system makes use of multiple prestored groups and applications. In a peer-to-peer type system, each transmitting processor transmits group and function information. This arrangement facilitates communications between a transmitting and receiving device.

In an alternate configuration, a transmitting device does not have direct access to group information. Instead, group information is provided by a common communication device in response to a message from a transmitting device.

The grouping information that is transmitted with the device messages specifies its membership with other devices. The membership or grouping can be changed as a function of the type of message that is being transmitted. This can allow different functional relationships.

For alarms, devices may be grouped so that smoke control is achieved with one grouping and annunciation is achieved with a different grouping. Door control devices could be grouped separate from smoke control or annunciation.

The different groupings can be achieved by including them at one time in a message or by transmitting separate messages specifying the different groups and the different functions. Examples of multiple groups include: 1) smoke control groups, 2) annunciation groups, 3) door lock groups, 4) lighting control groups, 5) ventilation control groups, and 6) fire suppression groups.

Devices can be loaded with information specifying multiple groups to which each respective device is assigned. In addition, each device can be loaded with application or function related codes that specify different applications (i.e. fire, security, HVAC, etc.).

Although the receiving devices are loaded with group and application programs, they are not yet "bound" to the transmitting devices. Transmitting devices, in one disclosed embodiment will broadcast their information with application type and individual address. The receiving devices will record the broadcast but not be able to determine how to function until another processor, such as a common control element, adds additional information to the system.

The common control element will dynamically make the group decisions based upon the transmitting device, effectively binding the transmitting device into a group. This process is dynamic and the same transmitting device may become a member of a different group based upon prior events. The type of device transmitting a state change is therefore linked to specific other devices by both the application type and group memberships, as defined by the common control element.

In an alternate or peer-to-peer system, there is no common control element and the transmitting device inserts the group numbers into the message. The transmitting message may contain multiple group numbers and/or application type numbers. The receiving devices may be programmed with multiple group numbers.

In both of the above systems, the devices are programmed with multiple groups and/or multiple applications. A particular system 1) may contain only one group and multiple application codes, or 2) may contain one application code and multiple groups or, 3) may contain multiple groups and multiple application codes.

The grouping can be dynamic in that the action can be different and dependent upon previous messages communicated on the system. If one group is in a predetermined state, then the grouping can be changed so that at least some devices are now members of different groups than originally programmed. The common control element can determine this new relationship between transmitting devices and receiving devices. New group numbers can also be downloaded to devices in real time during system operation to establish different operating groups dynamically and quickly.

In yet another embodiment, a multi-processor communication system having variable grouping exhibits enhanced flexibility by providing a communications protocol with programmable message lengths. In one aspect, a command can be sent to one or more processors specifying subsequent message lengths as an integer number of bytes.

The command can be transmitted separately or in conjunction with a message being transmitted. The lengths of messages being transmitted to one or more processors and the length of messages being received from one or more processors can be programmed independently of one another.

Message priorities can be programmed to reassign message priorities dynamically in response to changing conditions. In one embodiment, a first byte of a message can be assigned a priority indicating function.

In addition to establishing a priority for transmission, an execution priority can also be established by the priority byte. In this regard, transmission priority can be established independently of execution priority.

As a result of separating message content from transmission or execution priority, some copies of a message can be immediately transmitted to selected processors for immediate execution. Other copies of that message can be transmitted with a much lower priority to different devices.

In order to enhance message integrity, the location of a check sum or other error checking code can be specified during transmission to the receiving device or devices. The receiving device or devices can then extract the check sum or error checking code from the specified location in the message. The integrity of the received message can then be evaluated.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
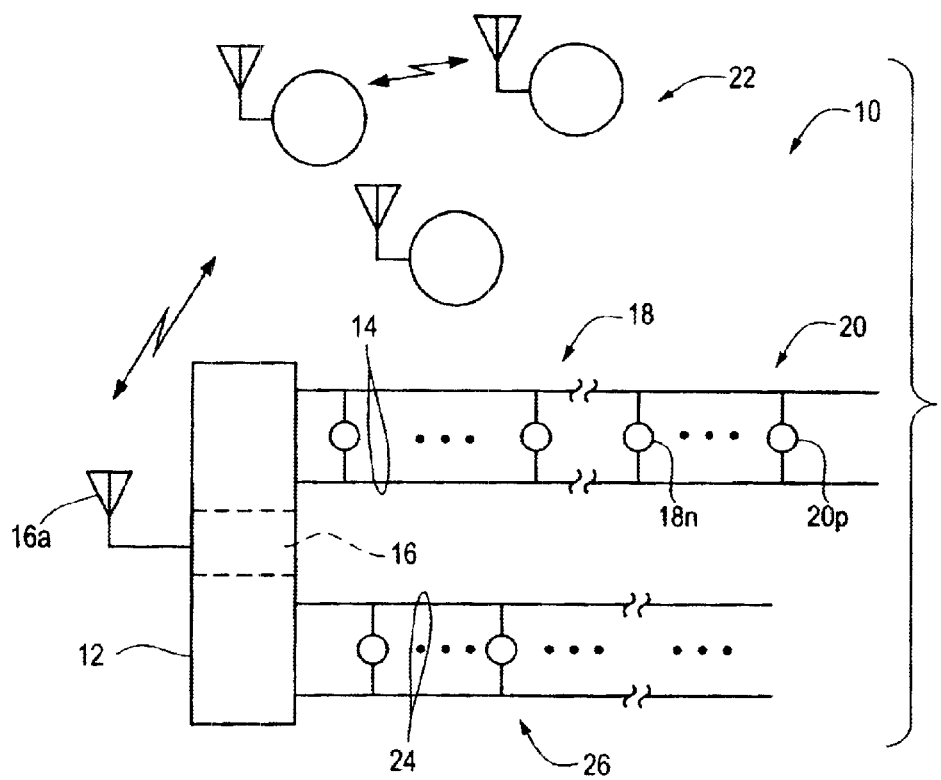
FIG. 1 is a block diagram of the system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a multi-processor communication system 10 which can be used for monitoring a plurality of conditions in one or more regions to be supervised. The system 10 includes an optional common control unit 12 which could be implemented as one or more interconnected programmed processors and associated, prestored instructions.

The unit 12 includes an interface for coupling, for example, to a communications medium 14, is illustrated in FIG. 1 for exemplary purposes only as an optical or electrical cable. Alternately, the system 10 can communicate wirelessly, such as by RF or infrared, via transceiver 16, illustrated in phantom in FIG. 1, and antenna 16a.

Coupled to medium 14 is a plurality of ambient condition detectors 18, such as device 18n, and a plurality of control or function units 20, such as device 20p. It will be understood that the relative arrangement of the members of the pluralities 18 and 20 relative to the medium 14 is not a limitation of the present invention.

The members of the plurality 18 can include intrusion sensors, position sensors, gas sensors, fire sensors such as smoke sensors, thermal sensors or the like, and gas sensors all without limitation. The members of the plurality 20 can include solenoid actuated control or function implementing units, audible output devices, display devices, printers or the like.

Where system 10 incorporates a wireless communications medium, a plurality 22 of wireless units or devices could be in bidirectional communication with each other and with transceiver 16. The plurality 22 can include, without limitation, ambient condition detectors, as noted above as well as control or function implementation devices without limitation.

One exemplary form of the device 18, 20, 22 of FIG. 1 is disclosed in U.S. Pat. No. 6,326,880. That patent has been assigned to the assignee hereof and is incorporated by reference.

Also coupled to the control unit 12 via a medium 24, illustrated for example as a pair of electrical cables, is a plurality 26 of output devices. These could include audible or visible output devices without limitation, speech output devices and the like. The devices 26 are intended to broadcast a message, which might indicate an alarm condition, in one or more predetermined regions.

System 10 provides an enhanced level of flexibility and upgradeability by supporting variable length message formats. Message lengths can be altered in the field after installation.

Figure 2:
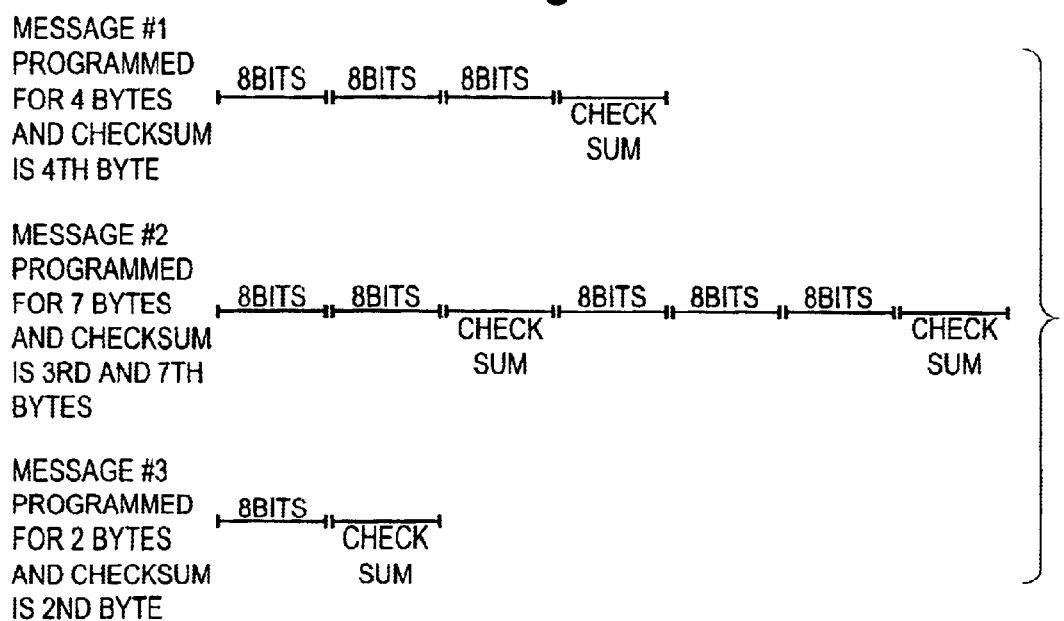
FIG. 2 illustrates schematically a plurality of messages having different, programmed, lengths.

FIG. 2 illustrates several messages each of which has a different, preprogrammed, length. Message No. 1 has been preprogrammed to have a length corresponding to four data bytes. As illustrated in FIG. 2, a check sum is transmitted in the fourth byte of message No. 1.

Message No. 2 has been preprogrammed for a length corresponding to seven data bytes. In message No. 2, illustrated in FIG. 2, a check sum is transmitted in both byte No. 3 and in byte No. 7.

Message No. 3 of FIG. 2 has been programmed to have a length corresponding to two data bytes. In message No. 3, the check sum is transmitted in the second byte.

With respect to the various lengths of messages illustrated in FIG. 2, a predetermined location for a check sum can be downloaded to the various devices of the system. Hence, in addition to being able to program different message lengths, the location of the check sum byte is also programmable.

A separate message length setting command can be transmitted from a selected device in the system 10 or from the control element 12. Similarly, information pertaining to the location of the check sum can be downloaded from a selected device in the system 10 or the control element 12.

Figure 6:
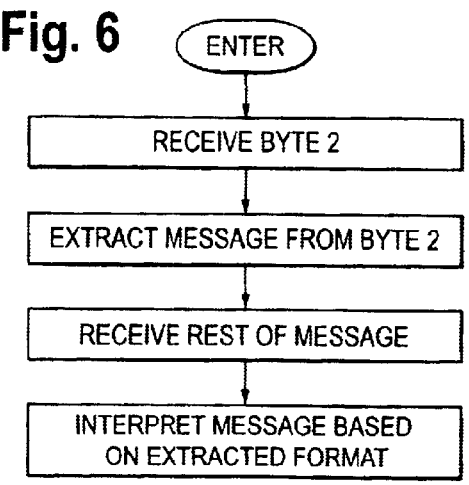
FIG. 6 is a flow diagram illustrating reading a selected byte of a message and using the contents of that byte to interpret the rest of the message.

A selected byte or bytes of a received message can specify the location of the error checking codes, such as a checksum, in the received message. In addition, that byte or bytes can include additional information, such as message type or format usable by a receiving device, illustrated in FIG. 6.

Priorities can be assigned to messages to be transmitted from devices on the system 10. For example, the first byte of a transmitted message can carry the assigned priority for that message. This byte can determine not only transmission priority but also an execution or action priority of a message received at a device, such as device 20p of system 10.

A higher priority message transmission will be carried out by a transmitting device or transmitting control element before lower priority messages are transmitted. In addition, the action or function represented by a higher priority message will be carried out or take precedence over lower priority messages.

As those of skill in the art will understand, a system in accordance herewith makes it possible to reassign message priority, as well as execution priority, independent of message content. Hence, the same message content can be transmitted with various transmission priorities and various action or execution priorities. In an instance where the system 10 corresponds to a region monitoring system such as a security system or a fire alarm system, different messages can be assigned different priority levels based on the type of functionality involved.

A receiving device or devices use a message's priority level to determining if a message should be carried out or executed.

For example, a security device may want to turn a device A to an on-state and a fire device may want to turn the same device A to an off-state. If both the security device and the fire detector transmit commands to the device A at the same time, device A has to give one a higher priority than the other to resolve the commands. This decision can be made based on the priority information.

The higher priority message will be executed first by device A. Once a message has been executed, the respective device will only execute a new message if it has a higher priority.

For example, a security message can command a door to lock. However, if fire is assigned a higher priority than security, a fire message can command the door to unlock, thus overriding a security message. A subsequent security message will not cause the door to lock again until the door is reset from the fire state. However, if it is subsequently determined that an HVAC message should be assigned a higher priority than a fire message for control purposes that higher priority information can then be attached to the HVAC message. Upon receipt of this higher priority message, the door device will respond to the HVAC message, overriding the earlier fire message.

Figure 3:
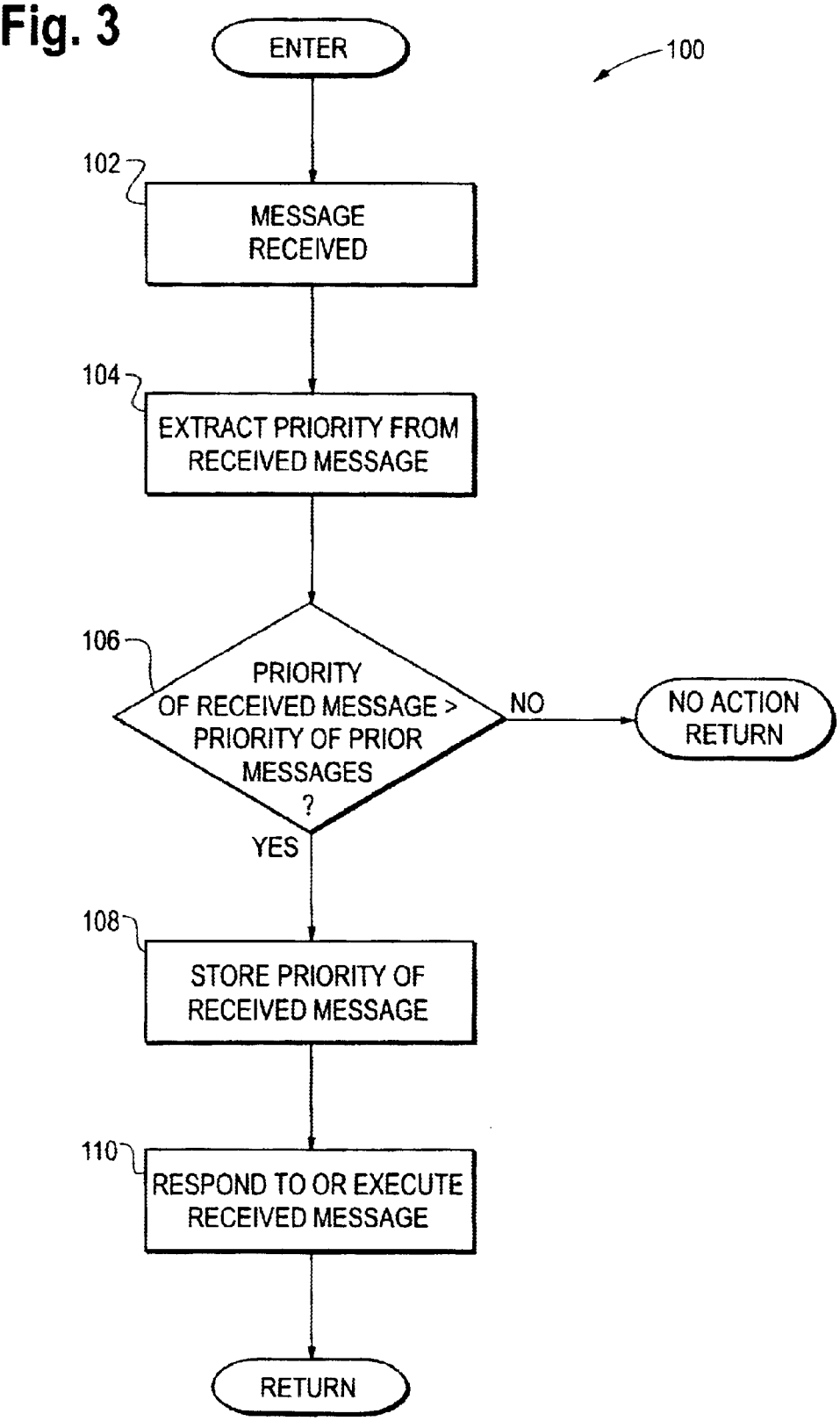
FIG. 3 is a flow diagram illustrating message processing.

FIG. 3 illustrates exemplary processing 100 in accordance with priority levels. In a step 102, the presence of a received message has been detected.

In a step 104, the priority information is extracted from the received message. In a step 106, the priority level of the received message is compared to the highest previously received priority level. If the priority level of the received message is less than or equal to the highest priority previously received, no action is taken.

If the priority of the received message exceeds the priority of the previously received message, the priority of the received message is stored in a step 108 and that message is responded to or executed in a step 110. Thus, contention between newly received messages or between a newly received message and all messages received since the device had received a reset command will always be resolved in favor of the highest priority received message.

System 10 has for exemplary purposes only, been described in the context of a monitoring system. Those of skill in the art will understand that the invention has applicability to multi-processor communication systems which exhibit other types of functionality as well.

The members of the pluralities 18, 20 or 22 preferably include programmed processors. The processors can be downloaded with group and application programs.

In one aspect, the type of application specifies a plurality of groups stored at the respective processor. In another aspect, the type of group specifies a plurality of applications which are stored at the respective processor.

Devices which need to initiate an activity or action will transmit a message on the respective wired or wireless medium. Typical broadcast information includes application type and address.

Where each of the members of the pluralities 18, 20, 22 stores its respective group and application information, the transmitting device will provide the group number or numbers as part of the communication. The transmitted message may contain multiple group numbers and/or application specifying identifiers.

In an alternate embodiment, a common communication device, in response to receipt of a message from a transmitting device, will retrieve from a central data base group and application information which is then broadcast throughout the media to complete the transmission initiated by the transmitting device.

The common control device can dynamically select groups based upon the message received from the transmitting device thereby binding the transmitting device to a group. The dynamic nature of the process is such that a single transmitting device may become a member of different groups based on prior events.

The devices in the system can be programmed to contain a single group and multiple application designators. Alternately, the devices may contain a single application designator and multiple group designations. Finally, the respective device may contain both multiple group designations and multiple application information.

Figure 4:
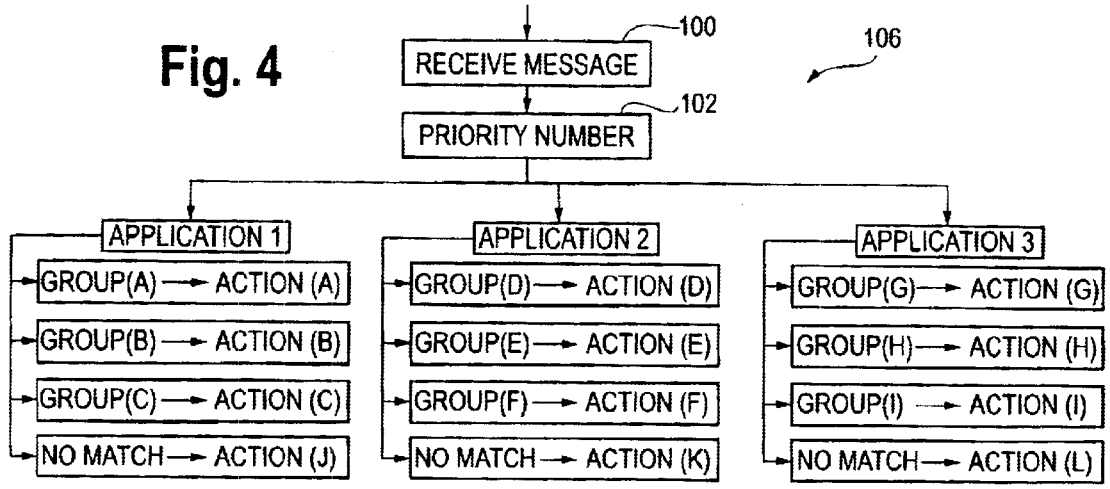
FIG. 4 is a tree illustrating programming of devices based on application type then group type.

FIG. 4 illustrates processing and a programmed tree associated with one or more of the devices of the pluralities 18, 20 or 22. In the embodiment of FIG. 4, in response to having received a message in a step 100, the priority of that message is evaluated, as discussed above, in a step 102. Assuming that the message is to be executed, as a result of its priority, an application designation is extracted from the message and compared to a plurality of prestored applications. The matching application is selected.

A transmitted group number, associated with that particular application, can then be compared to a plurality of prestored groups. In a step indicated generally at 106, for Application 2, in response to having identified either a matching group number or no match, a specified action is carried out. Hence, as illustrated in FIG. 4, depending on a received Application specifier and a received Group specifier, a given device can initiate or carry out a variety of different actions.

Representative actions include, without limitation, sounding verbal or audible alarms, energizing or de-energizing circuits in illumination systems, energizing or de-energizing ventilation systems, energizing or de-energizing door access systems or the like. Hence, by changing transmitted application designation and transmitted group number, a selected device will be able to carry out a plurality of different functions.

Figure 5:
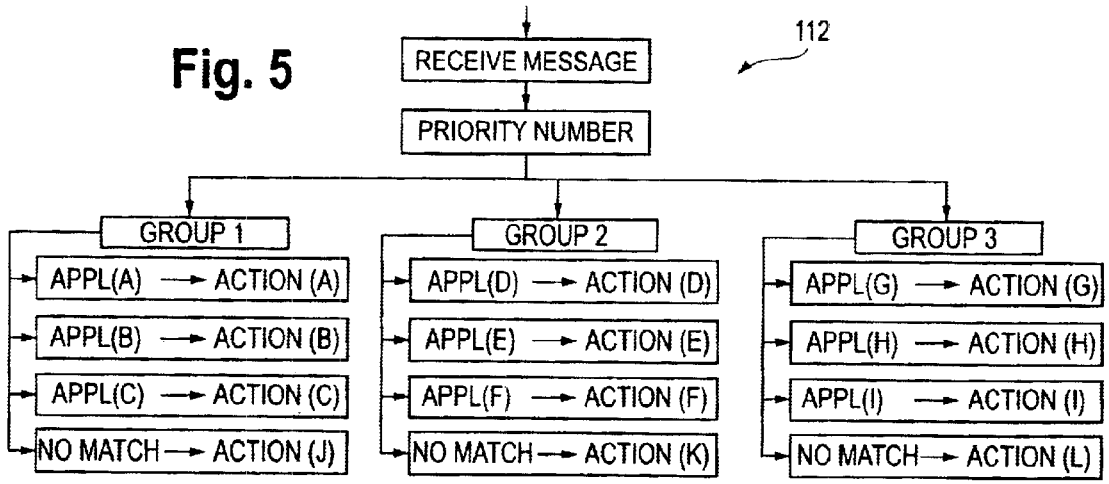
FIG. 5 is a tree illustrating programming of devices based on group type then application type.

FIG. 5 illustrates alternate processing steps and a tree which can be stored in a respective device. As indicated generally at 112 in response to having received a Group 2 representation from the medium, a plurality of different actions or activities can be selected based on a transmitted application designator. If desired, respective devices could store both types of selection trees depending on the nature and complexity of the respective device.

As a result of the above types of structures and processes, the respective devices can include multiple applications and can be members of multiple groups. This, of course, promotes versatility.

Group and application information can be downloaded to the respective devices when manufactured or installation. Both group and application designations can be changed in the field if needed.

The processing structures of FIGS. 4 and 5 provide a form of dynamic operation wherein the actions taken by a particular device can vary and be dependent upon previous messages communicated throughout the system. If desired, grouping and or function designations can be dynamically changed in real time. The revised group and function information can be stored at a common location and provided in response to transmitted messages. Additionally, group and application or function designation information can be downloaded to devices in real time to thereby establish different operating groups dynamically and quickly.

Byte 1 of the message contains the communication access priority for the message. If the message has a higher priority, it will be communicated on the medium before other lower priority messages.

An improvement in the prior art is that Byte 1 is variable and can be reassigned based upon the conditions present in the system. If the system is in a state where the common control unit needs priority in communications, it can assign itself a higher priority in Byte 1 and have priority access to the communications media. A device can also be programmed with a first priority but that priority can be changed to change its access priority to the communications media. For example, if a device sends a message and the message is not received without errors by another device, that device or other devices may repeat that message over and over but at a lower priority such that it still attempts to communicate the original with a predetermined device but does not interfere with other devices transmitting high priority information. Alternately, a device can be downloaded with a new priority to reflect the new conditions in the system, a communication from a common control unit to an annunciation device may initially have a low priority but then be changed to a higher priority once alarms are detected to the system.

The system is therefore dynamic and can change the priority of the devices in the system for communication access. The priority byte can be determined by a downloaded priority or a predetermined sequence of priorities as a function of the system condition. The priority can be automatically determined in the devices based upon a selection from a plurality of priorities stored in the devices.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A multi-processor, peer-to-peer communication system comprising:
   a communications medium; and
   a plurality of processors, coupled to the medium, where the processors are capable of transmitting and receiving messages from the medium;
   the processors are programmed with functions to be performed in accordance with associated designated group(s) information received from transmitted messages on the medium;
   wherein at least one of the processors originating a transmitted message includes instructions for sending a message with instructions for performing one or more selected functions without including information corresponding to the designated groups; and
   wherein at least one of the processors other than the processor originating the transmitted message is a designated common processor, which includes instructions for receiving the transmitted message, determining the appropriate designated group(s) information, and transmitting the appropriate designated group(s) information, such that the designated group(s) information is inserted into the transmitted message in addition to the information from the originator of the transmitted message.

2. A system as in claim 1 wherein the transmitted message is variable in length; and the transmitted message contains an indicator for the location(s) of error check information within the transmitted message, wherein the error check information is used to determine if the transmitted message contains errors prior to carrying out the functions associated with the transmitted message.

3. A system as in claim 2 wherein the processors receiving the transmitted message insert an error indicator into the same message if an error in the transmitted message is detected.

4. A system as in claim 2 wherein the processors do not carry out the function if an error is present in the transmitted message.

5. A system as in claim 2 wherein the processors receiving the transmitted message transmit an error message if an error in the transmitted message is detected.

6. A system as in claim 2 wherein at least some of the processors include ambient condition sensors.

7. A system as in claim 1 wherein the designated common processor providing the information to bind processors by group includes circuitry for extracting an identifier of the processor originating the transmitted message.

8. A system as in claim 7 wherein the identifier is the address of the processor originating the transmitted message.

9. A system as in claim 1 wherein the functions to be performed are executable instructions dependent upon the information in the message transmitted from the originating processor.

10. A system as in claim 1 wherein the designated common processor includes a plurality of stored group representations, wherein one or more of the designated group(s) include multiple processors.

11. A system as in claim 1 wherein the designated common processor is not a member of any of the designated group(s).

12. A system as in claim 1 wherein the types of groups include ambient condition control groups, annunciation groups, door access control groups, lighting control groups, ventilation control groups, security groups, motor contort groups, gas control groups, and fire control groups.

13. A multi-processor, peer-to-peer communication system comprising:
    a communications medium;
    a plurality of processors coupled to the medium, where the processors contain circuitry capable of transmitting and receiving messages from the medium;
    wherein the messages contain both designated group(s) and application(s) information;
    processors are programmed with more than one function to be performed which are associated with the combination of both the designated group(s) information and application(s) information received from transmitted messages on the medium wherein a processor originating a transmitted message sends application information as part of the message information but does not send the designated group(s) information; and
    the designated group(s) information is provided by a designated common processor other than the processor originating the transmitted message, such that the designated group(s) information is inserted into the transmitted message in addition to the information from the originator of the transmitted message.

14. A system as in claim 13 wherein the information is sorted by application(s) and then by designated group(s) in order to determine the function to be performed by a processor.

15. A system as in claim 13 wherein the information is sorted first by designated group(s) and then by application(s) in order to determine the function to be performed by a processor.

16. A system as in claim 14 or claim 15 wherein the application(s) have a priority associated with them.

17. A system as in claim 16 wherein the processor will not perform the function associated with the combination of both a designated group(s) and application(s) if the priority is lower than that of a previous function performed by a processor.

18. A system in claim 14 or 15 wherein the designated group(s) have a priority associated with them.

19. A system as in claim 18 wherein the processor will not perform the function associated with the combination of both a designated group(s) and application(s) if the priority is lower than that of a previous function performed by a processor.

20. A system as in claim 13 wherein the designated group(s) information includes a building indicator or location information within the building.

21. A system as in claim 20 wherein the location information within the building is the floor or room information.

22. A system as in claim 13 wherein the application(s) information includes at least one of fire, security, HVAC, lighting, gas control, motor, and annunciation applications.

23. A system as in claim 13 wherein the functions to be performed are executable instructions.

24. A multi-processor, peer-to-peer communication system comprising:

a communication medium;

a plurality of processors, coupled to the medium, capable of transmitting and receiving information on the communication medium;

wherein some of the plurality of the processors include instructions for transmitting message information that does not contain group information;

wherein at least one of the plurality of processors is a common processor including pre-stored group information for associating with at least some of the messages initially transmitted without group information;

wherein the common processor includes instructions for receiving a message with message information transmitted by another processor on the communication medium, determining group information including at least one group for associating with said message information, and transmitting the determined group information onto the communication medium, in the same message, without repeating the message information transmitted by the other processor; and wherein at least some of the processors of the plurality of processors associate the group information transmitted by the common processor with the message, transmitted by the other processor, that did not contain group information.

25. A system as in claim 24 wherein at least some of the plurality of processors include predetermined group information and predetermined executable routines stored in an associated memory, and instructions for executing at least one of said predetermined executable routines if the at least some of the plurality of processors receive group information from the communication medium that does not match their predetermined group information stored in memory.

26. A system as in claim 25 wherein at least some of the processors select executable routines for execution from a plurality of predetermined executable routines based upon the message information received by the processor.

27. A system as in claim 25 wherein the processor selects an executable routine from a plurality of executable routines stored in memory based upon the message information.

28. A system as in claim 24 wherein at least some of the plurality of processors include predetermined group information and predetermined executable routines stored in an associated memory, and instructions for executing at least one of said predetermined executable routines if the at least some of the plurality of processors receive group information from the communication medium that matches their predetermined group information stored in memory.

29. A system as in claim 28 wherein at least some of the processors select executable routines for execution from a plurality of predetermined executable routines based upon the message information received by the processor.

30. A system as in claim 24 wherein the message information includes at least some application information.

31. A system as in claim 30 wherein the application information includes ambient condition measurement, annunciation, door access, lighting, ventilation, security, motor control, gas measurement, gas control, and fire control applications.

32. A system as in claim 24 wherein the group information includes at least some application information.

33. A system as in claim 32 wherein the application information includes ambient condition measurement, annunciation, door access, lighting, ventilation, security, motor control, gas measurement, gas control, and fire control applications.

34. A system as in claim 24 wherein the group information includes a group designation.

35. A system as in claim 24 wherein the group information includes a unique designation for each of the one or more processors in the group.

36. A system as in claim 24 wherein the common processor is not included in any of the groups defined within the predetermined group information, and wherein the common processor only includes instructions for providing group information to the plurality of other processors on the communication medium.

37. A system as in claim 24 wherein the common processor is a central control unit including instructions for providing communication control to the processors on the communication medium.

* * * * *